United States Patent [19]

Oda et al.

[11] 4,112,833

[45] Sep. 12, 1978

[54] MICROWAVE COOKING DEVICE

[76] Inventors: Roy N. Oda; Lorraine K. Oda, both of 1553 Copper Lantern Dr., Hacienda Heights, Calif. 91745

[21] Appl. No.: 844,889

[22] Filed: Oct. 25, 1977

[51] Int. Cl.² .......................... H05B 9/06; A47S 27/00
[52] U.S. Cl. ........................................ 99/425; 99/441; 99/446; 99/DIG. 14; 126/390; 219/10.55 E; 426/243
[58] Field of Search ................. 126/390; 219/10.55 E; 426/242, 243; 99/422, 425, 444, 446, 441, 451, DIG. 14

[56] References Cited

U.S. PATENT DOCUMENTS

| | | | |
|---|---|---|---|
| 2,714,070 | 7/1955 | Welch | 126/390 X |
| 3,079,912 | 3/1963 | Griem | 126/390 |
| 3,230,864 | 1/1966 | Krajewski | 99/446 |
| 3,302,632 | 2/1967 | Fichtner | 126/390 |
| 3,943,320 | 3/1976 | Bowen | 219/10.55 E |
| 3,985,990 | 10/1976 | Levinson | 99/425 X |
| 3,994,212 | 11/1976 | Wong | 99/444 |

*Primary Examiner*—Billy J. Wilhite
*Attorney, Agent, or Firm*—Smyth, Pavitt, Siegemund, Jones & Martella

[57] ABSTRACT

A utensil primarily for use in cooking fat containing products such as bacon, frankfurters, sausage, hamburgers and the like, includes an outer shell supported on a base and an inner shell disposed within the outer shell and also supported on the base. The base includes a grease reservoir while the lower end of the inner shell includes apertures to permit flow of grease into the grease reservoir. Strip-like products such as bacon and the like are draped over the inner shell such that a portion thereof contacts the outer surface of the inner shell and another portion contacts the inner surface of the inner shell and another portion contacts the inner surface of the inner shell. Preferably, the inner shell extends vertically above the outer shell, the shells being made of a material which is transparent to microwave energy. The inner shell may support a platform on which other utensils may be placed or on which products to be cooked may be placed. Also, the inner shell may support an accessory for cooking elongated products such as frankfurters and sausage. Various forms are described.

15 Claims, 6 Drawing Figures

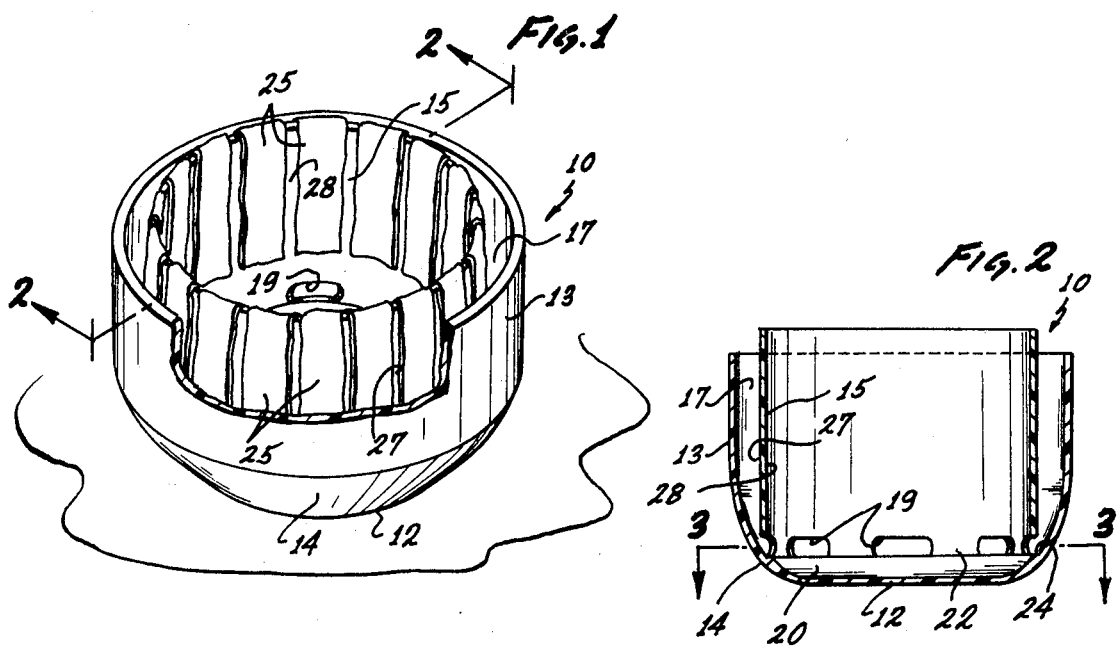
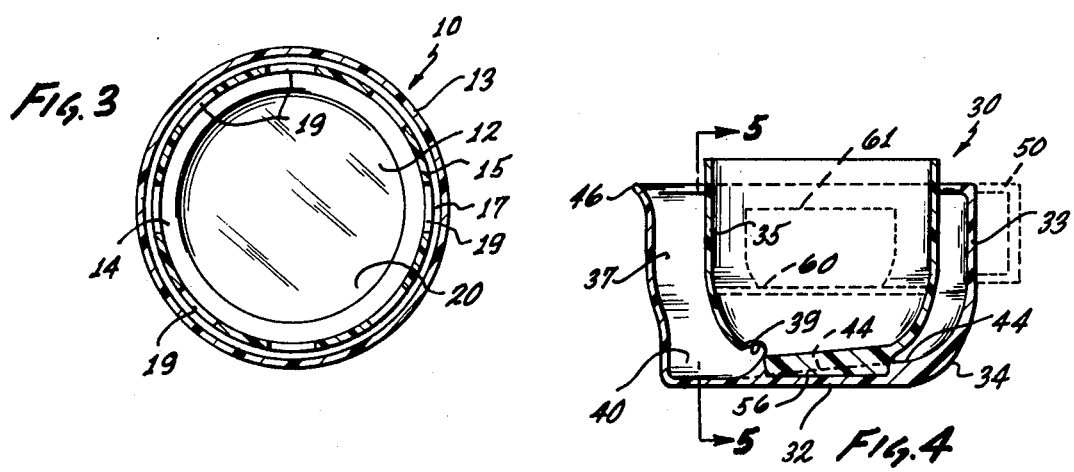
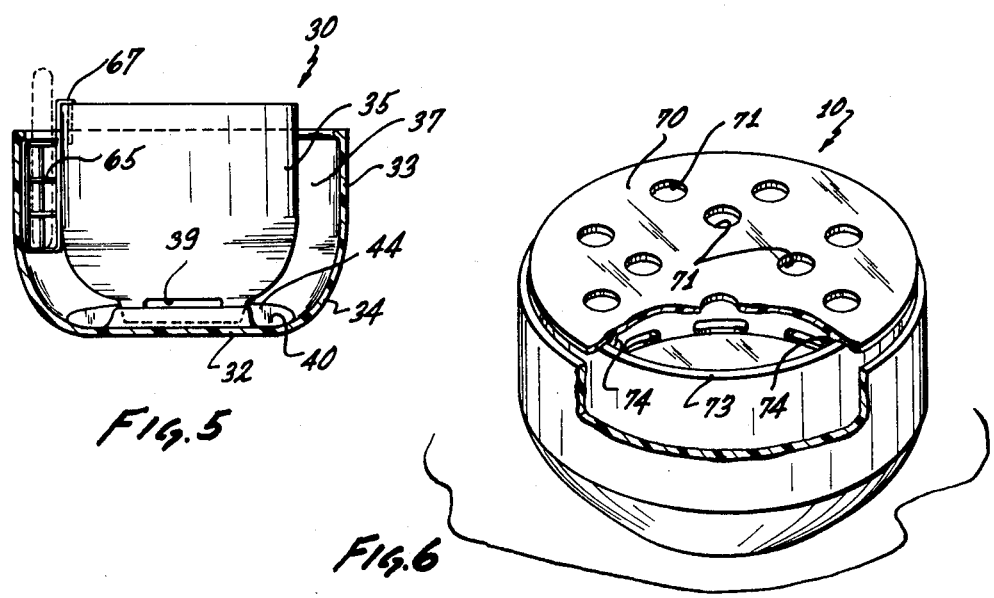

MICROWAVE COOKING DEVICE

BACKGROUND OF THE INVENTION

This invention relates to a cooking utensil, and more particularly, to an improved cooking utensil for use in cooking fat-containing products such as bacon and the like by microwave energy.

DESCRIPTION OF THE PRIOR ART

Microwave cooking has now become widely accepted for the preparation of foods in restaurants, domestic use and institutional use. The electromagnetic waves at microwave frequencies assigned by the federal regulatory agencies are radiated within an enclosure from a source of energy such as a magnetron. The cooking is accomplished by high frequency oscillating movements of the molecules in the product being cooked.

Since microwave ovens offer the convenience of relatively quick cooking and relatively low energy, their use is increasing. One of the difficulties heretofore associated with microwave cooking is related to products in which fats are generated or expressed from the product during cooking and which tend to splatter over the interior of the microwave oven. For example, if strips of bacon are cooked in a flat surface type microwave ovenware, grease tends to accumulate at the bottom of the utensil and is in contact with the bacon and splatters over the interior surface of the microwave oven and is ultimately charred to a dark residue which is difficult to remove. Effectively, the same condition exists with respect to hamburgers, sausages, and frankfurters.

In the case of bacon and other fat releasing materials such as hamburgers, sausages, etc., one approach taken domestically has been to place the product on paper napkins or a paper plate and insert the microwave cookware with paper napkins thereon or paper plates into the oven for preparation of the product.

More specifically, in the case of strip bacon, towels and paper plates are frequently used in order to avoid grease splattering on the interior of the oven. The difficulty with this procedure is that the number of strips of bacon which can be prepared is somewhat limited.

Accordingly, a need exists for a unique utensil capable of cooking products such as bacon and other strip-like materials or elongated materials such as sausage and frankfurters which prevents splattering of the grease, and which may be easily stored and easily cleaned.

SUMMARY OF THE INVENTION

In accordance with the present invention a unique utensil is provided, principally to be used in microwave cooking of strip-like products such as bacon and the like, but which also permits cooking of elongated products such as frankfurters and sausage or vegetables by microwave energy.

In brief, the cooking utensil of the present invention includes a base which supports an outer shell within which is positioned an inner shell. The base includes a reservoir for collecting grease, the inner shell being provided with apertures to permit the flow of grease towards the reservoir. In the case of strip-like materials such as bacon, the bacon is positioned on the inner shell, or hung on the inner shell, such that a portion contacts the outer surface of the inner shell and another portion contacts the inner surface of the inner shell. The inner shell preferably extends vertically above the outer shell and is spaced from the outer shell. The shells are also microwave transparent in the sense that the shells are made of a material which will permit passage of the microwave energy through the shells.

During cooking, the bacon or other strip-like material is supported out of contact with the grease which flows downwardly by gravity into the reservoir as quickly as it is formed. Thus, during a cooking operation, the bacon or strip-like product is not continually in contact with a substantial amount of grease.

Any tendancy of grease to splatter is reduced since the strip-like materials are arranged vertically and any splattering is caught by the outer shell or confined within the inner shell. Since the inner and outer shells are spaced from each other, accessories may be mounted on either the inner or outer shell for cooking elongated products such as hot dogs and sausages. Also, a platform may be supported by the inner shell in order to support some other small utensil or for support of a meat patty or other grease liberating product.

The utensil itself is preferably made of ceramic or glass or plastic, it being understood that the material used to fabricate the utensil should be stable against deformation by hot grease, and microwave energy transparent.

In a preferred form, the utensil is generally cylindrical in shape and since the strips are hung vertically, a greater number of strips can be cooked than could be cooked on a flat member of the same diameter as the cylindrical utensil. Also, the dual wall arrangement constitutes a splatter proof shield which quickly withdraws greases from the products being cooked.

Further objects and advantages of the present invention will be best understood by reference to the following specification taken in connection with the accompanying drawings.

BRIEF DESCRIPTION OF THE DRAWINGS

FIG. 1 is a view in perspective with a portion thereof broken away showing the cooking utensil in accordance with the present invention;

FIG. 2 is a view partly in section and partly in elevation taken along the lines 2—2 of FIG. 1;

FIG. 3 is a view in section taken along the lines 3—3 of FIG. 2;

FIG. 4 is a sectional view of a modified form of utensil in accordance with the present invention;

FIG. 5 is a view partly in section and partly in elevation taken along the lines 5—5 of FIG. 4; and FIG. 6 is a view similar to FIG. 1 illustrating the use of the device of the present invention with a platform.

DESCRIPTION OF THE PREFERRED EMBODIMENT

Referring to the drawings which illustrate a preferred form of the present invention, FIGS. 1–3 show a utensil generally designated 10 for use in cooking products by microwave energy wherein the products contain fat which is released as hot grease during cooking. Typical of the common products which may be cooked using the utensil 10 are bacon or other strip-like products, frankfurters, sausage, meat patties and the like, as will be described in detail hereinafter.

The utensil 10 includes a base member 12 which supports a first generally vertically upstanding outer shell member 13 which slopes inwardly towards the base, as indicated at 14. In the form illustrated, the outer shell is preferably cylindrical and circular so as to maintain symmetry of the utensil. In effect, the outer shell and the base form an open ended container in which the outer shell 13 forms the wall.

Disposed within the outer shell and supported by the base is an inner shell 15, the inner shell extending generally vertically upwardly and being separate from the outer shell and the base, the latter two members preferably being formed as a unitary structure. As illustrated, the inner shell 15 is spaced from the outer shell 13 thereby forming an annular chamber 17 between the two shells. As shown, the inner shell extends vertically above the outer shell.

The lower portion 22 of the inner shell is provided with apertures 19, a plurality of such apertures being shown in order to permit flow of grease into a grease reservoir 20 formed in the base and defined as that region between the lower end of the inner shell and the base member 12. For purposes of simplicity, it is preferred that the utensil be formed principally of two pieces, the outer shell and base formed as a unitary structure, and the inner shell being formed as a separate member which is located on a shoulder 24 extending around the lower portion of the outer shell in that region thereof designated 14 which forms the sloping wall interconnecting the outer shell to the base. It should be understood that the inner and outer shells and base may be constructed as a unitary structure.

In the preferred form, the inner and outer shells are formed of a material which is transparent to microwave energy such as heat resistant plastic which is compatible with food products or heat resistant glass or ceramic or other appropriate nonmetallic material also preferably stable against deformation when contacted by hot grease. Virtually any of the plastic materials used in the manufacture of dishwasher safe plastic utensils may also be used. The base member likewise is formed of a heat resistant material also preferably microwave energy transparent. Thus, the outer shell and base may be of the same material while the inner shell may be of a different material. For example, the outer shell and base may be of glass while the inner shell may be of plastic or vice versa, or the outer shell and base and the inner shell may be of the same material.

In operation, and describing the operation with respect to bacon as illustrative, each strip of bacon 25 (FIG. 1) is draped or hung on the inner shell such that a portion of the strip of bacon contacts the outer surface 27 of the inner shell and another portion of the strip 25 contacts the inner surface 28 of the inner shell. As seen in FIG. 2, the inner shell extends vertically above the outer shell by approximately 1 inch such that the bacon strips can be seen without opening the oven door and to ease loading of the bacon. It should be understood, however, that the outer shell may be of the same height or of slightly more height than the inner shell if it is desired to more completely shield the grease splatter, although it is preferred in accordance with the present invention that the inner shell extend vertically above the outer shell.

During the cooking operation, as grease is freed from the bacon, it either flows down the inner surface 28 of the inner shell directly into the reservoir 20 or flows down the outer surface 27 of the inner shell and through the apertures 19 into the reservoir 20 or, flows down the inner surface 29 of the outer shell and through the apertures 19 into the reservoir. Upon completion of the cooking operation, the utensil and the cooked bacon are removed from the oven, and the bacon strips may be removed individually or the entire inner shell removed. The outer shell and base generally are hot because of the heat from the liberated hot grease which is located in the reservoir 20. The grease may be disposed of in the customary fashion and the utensil may be washed either in a dishwasher or manually and is again ready for use.

In the form illustrated in FIGS. 1–3, the overall height of the unit from the base to the upper end of the outer shell is approximately 5½ inches, while the inner shell is also approximately 5½ inches, the inner shell extending above the outer shell by approximately 1 inch and the reservoir being approximately 1 inch deep with the chamber 17 being approximately 1 inch, that is, the outer surface 27 of the inner shell is spaced about 1 inch from the opposed surface of the outer shell. For an outer shell diameter of 7 inches and an inner shell diameter of 4¾ inches, approximately 12 slices of bacon may be cooked assuming an average width of approximately 1¼ inches each. If the outside diameter is increased to 9 7/16 inches and the inner shell diameter to 7 3/16 inches, approximately 18 slices of bacon may be cooked at one time, while 30 slices of bacon may be cooked at one time with an outside diameter of 14 ¼ inches and an inner shell diameter of 12 inches. Thus, it is apparent that a larger number of slices of bacon may be cooked at one time with the utensil of the present invention in contrast to a flat dish of approximately 14 inches in diameter. Moreover, with the utensil of the present invention, the splattering of the grease is substantially eliminated by providing a reservoir into which the grease may flow by gravity, and also offers the advantage that the bacon is not totally immersed in grease during the cooking operation. It has also been observed that using the device of the present invention results in bacon that cooks more crispy and dryer in the sense that it does not include grease which has dripped away vertically, and bacon appears to be somewhat more tasty. Further, the need to use paper plates or paper towels is eliminated, which offers economies. Moreover, it is not necessary that the utensil be covered, although if one desires to use a utensil in which a cover is used, it is important to use a cover made of microwave energy transparent material.

Referring to FIGS. 4 and 5, another form of utensil 30 is illustrated and includes a base member 32 and an outer shell member 33 a portion of which includes a sloping wall 34. Supported on the base is an inner shell 35 such an annular chamber 37 is formed between the two shells. The inner shell again includes an aperture 39 which cooperates with a reservoir generally indicated at 40. In this particular form of utensil, the base includes sloping walls 44 such that the grease is caused to flow in a localized area located immediately below that portion of the outer shell 33 in which a pour spout 46 is formed. Opposite the pour spout 46, the outer shell may have a handle 50. The device illustrated in FIGS. 4 and 5 may be made of any of the materials previously described.

In the form illustrated in FIG. 4, the inner shell is inwardly sloped so as to follow the contour of the outer shell. Thus, the inner shell progressively decreases somewhat in diameter, and the inner shell may be a separate member from the outer shell and mounted on the base through a bell and spigot type of assembly generally indicated at 56. Alternatively, the utensil 30 shown in FIGS. 4 and 5 may be made of one piece, such as glass, ceramic, or plastic as previously mentioned.

Since the inner shell slopes slightly, it is possible to place in the inner shell a platform 60 which is supported by the inner shell and which may receive a smaller utensil such as a cup 61. The platform is preferably of microwave energy transparent material and may be perforated if desired. In this particular form, it is possible to cook bacon strips or other strip-like materials as previously mentioned, and at the same time heat water for poached eggs or instant coffee at the same time that the bacon strips are being prepared.

The handle 50 provides a convenient way of removing the utensil from the microwave oven and for handling the utensil which may be quite hot because of the grease which collected in the reservoir 40.

Since an annular chamber is formed between the inner and outer shell, it is also possible to cook other grease containing, elongated products such as sausage and frankfurters by the use of an accessory 65 proportioned to be received within the two shells and which permits the sausage links or frankfurters to be arranged vertically in the annular space 37 and supported by the accessory. As illustrated, the accessory is in the form of a basket having a hanging element 67 and small compartments to receive 2 or 3 lengths of sausage or 2 or 3 frankfurters. More than one accessory may be used or the accessory may be proportioned to fit a substantial arcuate section of the annulus between the inner and outer shell so as to receive an appropriate number of lengths or sausage. The accessory 65 is preferably formed of a heat resistant plastic which is compatible with food, and includes an open mesh network, as illustrated in order to permit the grease to flow downwardly into the reservoir. Again, as in the case of cooking bacon, the inner or outer shell elements form a splatter guard and confine the released grease to the annulus and thus assures that the grease flows into the reservoir 40.

In the form of the invention illustrated in FIG. 6, the utensil 10 is basically the same as that shown in FIG. 1, except that a platform 70 including multiple apertures 71 is supported by the upper edge 73 of the inner shell, the underside of the platform having a centering rib 74 formed therein for locating the platform on the shell 15. An apertured platform 70 may be used for the preparation of sausage in the form of flat patties or hamburger patties, the platform being of a microwave transparent material such as ceramic, glass, or heat stable and food compatible plastic. The apertures permit passage of the grease into the grease reservoir 20. It is also possible, in accordance with the present invention to provide a platform 70 which is slightly dished so that scrambled or fried eggs may be prepared at the same time that bacon is being prepared at the same time that bacon is being prepared. Another modification includes a platform provided with one or more depressions located in the open space defined by the inner shell 15 such that one or more eggs may be poached at the same time that bacon is being prepared.

It will become apparent from the above description that the utensil of the present invention represents a relatively versatile device which is easily stored, which is light weight, easily cleaned, and which offers unique advantages in the preparation of certain products by use of a microwave oven. The advantages of the device of the present invention are achieved particularly in the preparation of strip-like materials such as bacon, which are placed on the inner shell which forms a bacon hanger. Thus the bacon is cooked in an environment free from excessive fat which drains downwardly into the reservoir. Perhaps the singular most significant advantage of the device of the present invention is the ability to prepare a substantially large number of strips of bacon at one time than can be achieved with a flat pan of the same diameter as the outer shell. The ability to prepare a larger number of slices of bacon is an advantage to commercial food operations and institutional food operations.

Numerous modifications will be apparent to those skilled in the art and it will be understood that the various modifications which may be made are intended to be covered in the appended claims to the extent that such modifications fall within the true spirit and scope of the present invention.

What is claimed is:

1. A utensil for use in cooking products by microwave wherein the products contain fats released as hot grease during the cooking energy comprising:
   a base member,
   a first generally vertically upstanding outer shell member supported by said base member and cooperating therewith to form the outer wall of an open-ended container,
   a second generally vertically upstanding inner shell member supported by said base member and forming the wall of an open-ended inner container,
   said inner shell member being spaced from said outer shell member and cooperating with said outer shell member to form a chamber between said inner and outer shells,
   said inner shell member including means forming an aperture therein to permit flow of fat between the chamber and inner container, at least said first and second shells being of a microwave transparent material, and
   said base being of a material stable against deformation when contacted by hot grease.

2. A utensil as set forth in claim 1 wherein the inner shell extends vertically above the outer shell.

3. A utensil as set forth in claim 1 further including handle means mounted on said outer shell, and
   means forming a pour spout in said outer shell.

4. A utensil as set forth in claim 1 wherein said inner shell is separate from said base, and
   said base including sloped surface and defining a grease reservoir.

5. A utensil as set forth in claim 2 further including platform means,
   said platform means being supported by said inner shell.

6. A utensil as set forth in claim 2 further including means mounted on one of said inner and outer shells and positioned within said chamber for receiving elongated products to be cooked.

7. A utensil as set forth in claim 1 wherein each of said inner and outer shell members are cylindrical and wherein said chamber is generally annular in shape.

8. A utensil for use in cooking bacon and other strip-like products by microwave energy wherein said bacon and other strip-like products release hot grease during cooking comprising:
   a base member,
   an outer shell member supported by said base and cooperating therewith to form an open-ended container,
   an inner shell member supported to said base and located within and spaced from said outer shell member, said inner shell member forming a support for said bacon and strip-like material such that a portion extends between said shells and another extends inside the inner shell, means in said base forming a grease reservoir, means in said inner shell permitting flow of grease to said reservoir, said shells being of microwave transparent material, and said base being of a material stable against deformation when contacted by hot grease.

9. A utensil as set forth in claim 8 wherein said inner shell extends vertically above said outer shell.

10. A utensil as set forth in claim 9 wherein said inner shell is separate from said base and outer shell.

11. A utensil as set forth in claim 8 wherein said reservoir is formed in one portion of the base, and
said base including sloping portions for flow of said grease to said reservoir.

12. A utensil as set forth in claim 8 wherein said material is heat resistant plastic.

13. A utensil as set forth in claim 8 wherein said material is heat resistant glass.

14. A utensil as set forth in claim 8 wherein the outer shell includes a handle.

15. A utensil as set forth in claim 8 wherein each of said inner and outer shells is cylindrical in shape.

* * * * *